United States Patent
Wang et al.

(10) Patent No.: US 6,804,601 B2
(45) Date of Patent: Oct. 12, 2004

(54) SENSOR FAILURE ACCOMMODATION SYSTEM

(75) Inventors: Yue Yun Wang, Columbus, IN (US); Dennis Robinson, West Terre Haute, IN (US); George Brunemann, Cincinnati, OH (US); Danny R. Baker, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 118 days.

(21) Appl. No.: 10/101,790

(22) Filed: Mar. 19, 2002

(65) Prior Publication Data

US 2003/0182048 A1 Sep. 25, 2003

(51) Int. Cl.$^7$ ............... G06F 7/20; G06F 19/00; F02M 25/07; F02D 23/00
(52) U.S. Cl. ............... 701/107; 701/114; 60/602; 60/605.2
(58) Field of Search ............... 701/100, 101, 701/102, 103, 107, 114, 115; 123/479, 399, 488, 494, 406.18, 406.14, 688, 690; 60/602, 605.2

(56) References Cited

U.S. PATENT DOCUMENTS

| | | | |
|---|---|---|---|
| 4,450,815 A | 5/1984 | Mouri | 123/406.13 |
| 4,556,029 A | 12/1985 | Yamaguchi et al. | 123/41.15 |
| 4,804,139 A | 2/1989 | Bier | 236/35 |
| 4,943,924 A * | 7/1990 | Kanegae et al. | 701/115 |
| 5,073,865 A | 12/1991 | Togai et al. | 701/100 |
| 5,377,112 A | 12/1994 | Brown, Jr. et al. | 701/103 |
| 5,526,266 A | 6/1996 | Rutan et al. | 701/115 |
| 5,910,176 A | 6/1999 | Creger | 701/59 |
| 6,202,412 B1 | 3/2001 | Lange et al. | 60/602 |
| 6,253,551 B1 | 7/2001 | Lohmann et al. | 60/602 |
| 6,298,718 B1 | 10/2001 | Wang | 73/118.1 |
| 6,314,737 B1 | 11/2001 | Springer et al. | 60/612 |
| 2002/0078925 A1 * | 6/2002 | Kobayashi | 123/479 |

FOREIGN PATENT DOCUMENTS

| | | |
|---|---|---|
| CA | 2 354 944 | 9/2002 |
| DE | 19705766 C1 * | 8/1998 |
| GB | 2297394 A * | 7/1996 |
| JP | 08232749 A * | 9/1996 |
| JP | 90588 | 3/2001 |

* cited by examiner

Primary Examiner—Willis R. Wolfe
(74) Attorney, Agent, or Firm—Barnes & Thornburg

(57) ABSTRACT

A sensor failure accommodation system includes a control computer receiving a sensor signal corresponding to an engine operating condition, and estimating a value of the engine operating condition as a function of one or more engine operating parameters different than the engine operating condition. The computer is operable to control one or more air handling mechanisms as a function of a final engine operating condition value, and if the sensor producing the engine operating condition signal is error free the final engine operating condition value is the engine operating condition signal. If the sensor producing the engine operating condition signal has failed, the final engine operating condition value is the engine operating condition estimate, and if at least one sensor producing the one or more engine operating parameters has also failed, the final engine operating condition value is a commanded or other definable engine operating condition value.

38 Claims, 5 Drawing Sheets

SENSOR FAILURE ACCOMMODATION SYSTEM

FIELD OF THE INVENTION

The present invention relates generally to systems for controlling the operation of an internal combustion engine in the event of a sensor failure, and more specifically to such systems operable to control an air handling system of the engine in the event of such a failure.

BACKGROUND AND SUMMARY OF THE INVENTION

A wide variety of engine and/or vehicle operating condition sensors have been developed to provide information useful for controlling engine and/or vehicle operation. Many such sensors provide information that is critical to the control of engine operation, and engine operation may be compromised when such sensors fail.

In the event of critical sensor failure, modern engine control techniques typically implement one or more known recovery strategies. One such recovery strategy serves to derate engine fueling, and another known strategy implements one or more so-called "limp home" algorithms that allow the vehicle carrying the engine to operate with minimum functionality until engine/vehicle service can be provided.

Oftentimes, such critical failures do not extend to failure of other system componentry, and are instead confined only to failure of one or more sensors. What is therefore needed is a sensor failure accommodation system that allows for greater engine/vehicle functionality upon detection of one or more sensor failures. The present invention provides such a sensor failure accommodation system.

These and other objects of the present invention will become more apparent from the following description of the preferred embodiments.

DESCRIPTION OF THE PREFERRED EMBODIMENTS

Figure 1:
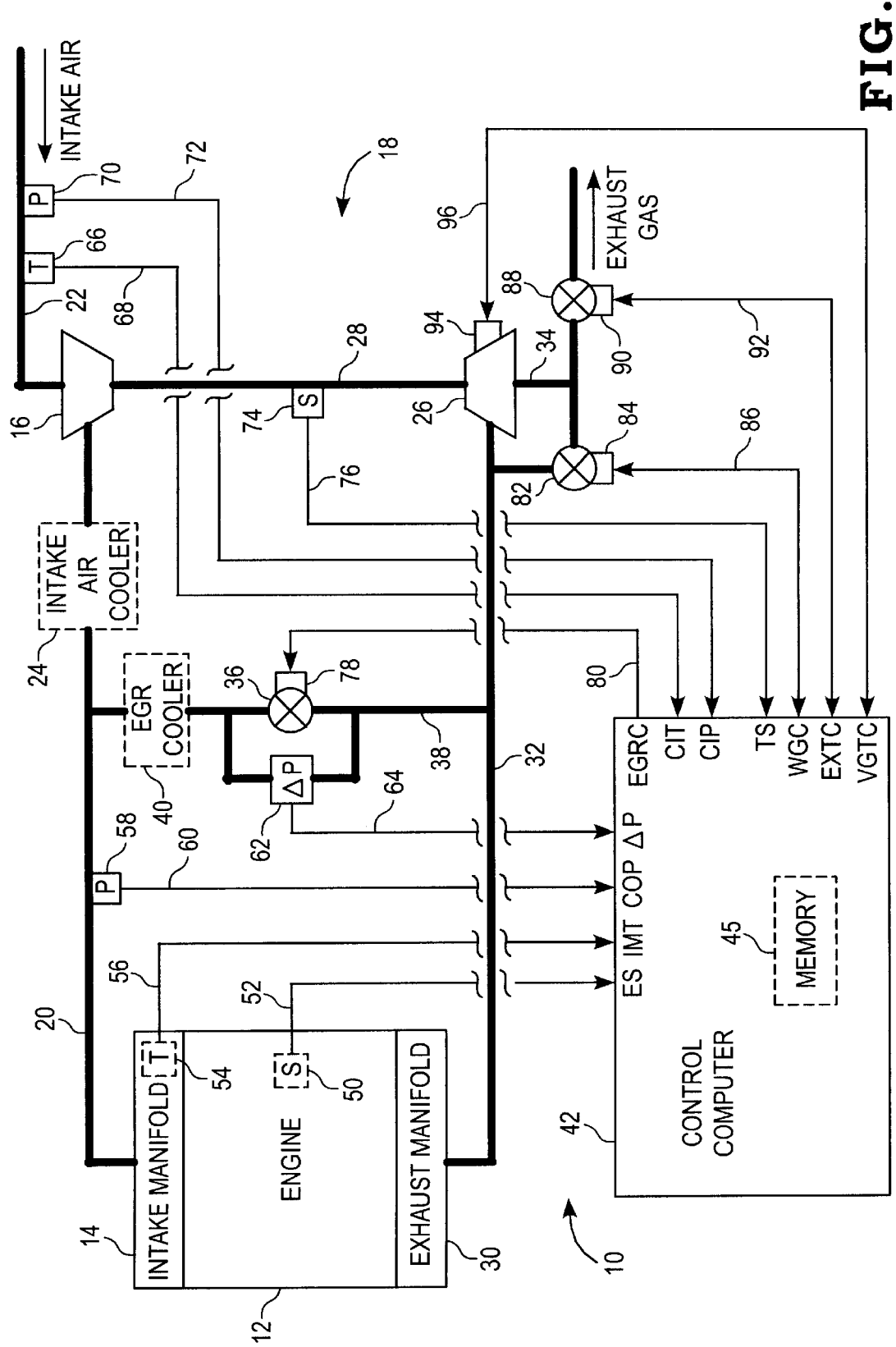
FIG. 1 is a diagrammatic illustration of one preferred embodiment of a system for accommodating sensor failures, in accordance with the present invention.

For the purposes of promoting an understanding of the principles of the invention, reference will now be made to a number of preferred embodiments illustrated in the drawings and specific language will be used to describe the same. It will nevertheless be understood that no limitation of the scope of the invention is thereby intended, such alterations and further modifications in the illustrated embodiments, and such further applications of the principles of the invention as illustrated therein being contemplated as would normally occur to one skilled in the art to which the invention relates.

Referring now to FIG. 1, one preferred embodiment of a system 10 for accommodating sensor failures, in accordance with the present invention, is shown. System 10 includes an internal combustion engine 12 having an intake manifold 14 fluidly coupled to an outlet of a compressor 16 of a turbocharger 18 via an intake conduit 20, wherein the compressor 16 includes a compressor inlet coupled to an intake conduit 22 for receiving fresh air therefrom. Optionally, as shown in phantom in FIG. 1, system 10 may include an intake air cooler 24 of known construction disposed in-line with intake conduit 20 between the turbocharger compressor 16 and the intake manifold 14. The turbocharger compressor 16 is mechanically coupled to a turbocharger turbine 26 via a drive shaft 28, wherein turbine 26 includes a turbine inlet fluidly coupled to an exhaust manifold 30 of engine 12 via an exhaust conduit 32, and further includes a turbine outlet fluidly coupled to ambient via an exhaust conduit 34. An EGR valve 36 is disposed in-line with an EGR conduit 38 disposed in fluid communication with the intake conduit 20 and the exhaust conduit 32, and an EGR cooler 40 of known construction may optionally be disposed in-line with EGR conduit 38 between EGR valve 36 and intake conduit 20 as shown in phantom in FIG. 1.

System 10 includes a control controller 42 that is preferably microprocessor-based and is generally operable to control and manage the overall operation of engine 12. Control computer 42 includes a memory unit 45 as well as a number of inputs and outputs for interfacing with various sensors and systems coupled to engine 12. Control computer 42, in one embodiment, may be a known control unit sometimes referred to as an electronic or engine control module (ECM), electronic or engine control unit (ECU) or the like, or may alternatively be a control circuit capable of operation as will be described hereinafter. In any case, control computer 42 preferably includes one or more control algorithms, as will be described in greater detail hereinafter, for accommodating sensor failures based on input signals provided by a number of actual sensors.

Control computer 42 includes a number of inputs for receiving signals from various sensors or sensing systems associated with system 10. For example, system 10 includes an engine speed sensor 50 electrically connected to an engine speed input, ES, of control computer 42 via signal path 52. Engine speed sensor 50 is operable to sense rotational speed of the engine 12 and produce an engine speed signal on signal path 52 indicative of engine rotational speed. In one embodiment, sensor 50 is a Hall effect sensor operable to determine engine speed by sensing passage thereby of a number of equi-angularly spaced teeth formed on a gear or tone wheel. Alternatively, engine speed sensor 50 may be any other known sensor operable as just described including, but not limited to, a variable reluctance sensor or the like.

System 10 further includes an intake manifold temperature sensor 54 disposed in fluid communication with the intake manifold 14 of engine 12, and electrically connected to an intake manifold temperature input, IMT, control computer 42 via signal path 56. Intake manifold temperature sensor 54 may be of known construction, and is operable to produce a temperature signal on signal path 56 indicative of the temperature of air charge flowing into the intake manifold 14, wherein the air charge flowing into the intake manifold 14 is generally made up of fresh air supplied by the turbocharger compressor 16 combined with recirculated exhaust gas supplied by EGR valve 36.

System 10 further includes a compressor outlet pressure sensor 58 disposed in fluid communication with intake conduit 20 and electrically connected to a compressor outlet pressure input, COP, of control computer 42 via signal path 60. Alternatively, pressure sensor 58 may be disposed in fluid communication with the intake manifold 14. In any case, pressure sensor 58 may be of known construction, and is operable to produce a pressure signal on signal path 60 indicative of air pressure within intake conduit 20 and intake manifold 14. Pressure sensor 58 is sometimes referred to as a so-called "boost pressure" sensor because it is operable to sense changes in pressure (i.e., "boost" pressure) within conduit 20 and intake manifold 14 resulting from the operation of the turbocharger 18, and is also sometimes referred to as an intake manifold pressure sensor. Pressure sensor 58 may accordingly be referred to as a boost pressure sensor, a compressor outlet pressure sensor, or an intake manifold pressure sensor, wherein any such terminology is intended to be interchangeable.

System 10 further includes a differential pressure sensor, or ΔP sensor, 62 fluidly coupled at one end to EGR conduit 38 adjacent to an exhaust gas inlet of EGR valve 36, and fluidly coupled at its opposite end to EGR conduit adjacent to an exhaust gas outlet of EGR valve 36. Alternatively, the ΔP sensor 62 may be coupled across another flow restriction mechanism disposed in-line with EGR conduit 38. In either case, the ΔP sensor 62 may be of known construction and is electrically connected to a ΔP input of control computer 42 via signal path 64. The ΔP sensor 62 is operable to provide a differential pressure signal on signal path 64 indicative of the pressure differential across EGR valve 36 or other flow restriction mechanism disposed in-line with EGR conduit 38.

System 10 further includes a compressor inlet temperature sensor 66 that is preferably disposed in fluid communication with intake conduit 22 and electrically connected to a compressor inlet temperature input, CIT, of control computer 42 via signal path 68. Temperature sensor 66 may be of known construction and is generally operable to produce a compressor inlet temperature signal on signal path 68 indicative of the temperature of ambient air entering the inlet of compressor 16 (i.e., entering the intake conduit 22). It is to be understood, however, that for the purposes of the present invention, sensor 66 need not be disposed in fluid communication with intake conduit 22 and may instead be positioned in any convenient location relative to system 10 as long as sensor 66 is operable to produce a signal on signal path 68 indicative of the temperature of ambient air.

System 10 further includes a compressor inlet pressure sensor 70 that is preferably disposed in fluid communication with intake conduit 22 and electrically connected to a compressor inlet pressure input, CIP, of control computer 42 via signal path 72. Sensor 70 may be of known construction and is generally operable to produce a compressor inlet pressure signal on signal path 72 indicative of the pressure of ambient air entering the inlet of compressor 16 (i.e., entering intake conduit 22). It is to be understood that for the purposes of the present invention, sensor 70 need not be disposed in fluid communication with intake conduit 22 and may instead be positioned in any convenient location relative to system 10 as long as sensor 70 is operable to produce a signal on signal path 72 indicative of the pressure of ambient air.

System 10 further includes a turbocharger speed sensor 74 that is preferably disposed about, or in proximity with, the turbocharger drive shaft 28 and electrically connected to a turbocharger speed input, TS, of control computer 42 via signal path 76. Sensor 74 may be of known construction and is generally operable to produce a turbocharger speed signal on signal path 76 indicative of the rotational speed of the turbocharger drive shaft 28. In one embodiment, sensor 74 is a variable reluctance sensor operable to determine turbocharger rotational speed by sensing passage thereby of one or more detectable structures formed on shaft 28. Alternatively, turbocharger speed sensor 74 may be any other known sensor operable as just described and suitably located relative to turbocharger drive shaft 28.

Control computer 42 also includes a number of outputs for controlling one or more air handling mechanisms associated with system 10. For example, EGR valve 36 includes an EGR valve actuator 78 electrically connected to an EGR control output, EGRC, of control computer 42 via signal path 80. Control computer 42 is operable, as will be described in greater detail hereinafter, to produce an EGR valve control signal on signal path 80, and EGR valve actuator 78 is responsive to the EGR valve control signal to control the position of EGR valve 36 relative to a reference position in a known manner.

Engine controller 42 also includes at least one output for controlling turbocharger swallowing capacity and/or efficiency, wherein the term "turbocharger swallowing capacity" is defined for purposes of the present invention as the exhaust gas flow capacity of the turbocharger turbine 26, and the term "turbocharger swallowing efficiency" refers to response of the turbocharger turbine 26 to the flow of engine exhaust gas. In general, the swallowing capacity and/or efficiency of the turbocharger 18 directly affects a number of engine operating conditions including, for example, but not limited to, compressor outlet pressure and turbocharger rotational speed. One aspect of the present invention is directed to controlling the swallowing capacity and/or efficiency of the turbocharger 18 via one or more various control mechanisms under the direction of engine controller 42 to thereby effectuate desired changes in one or more engine operating conditions, and exemplary embodiments of some such mechanisms are illustrated in FIG. 1. For example, one turbocharger swallowing capacity control mechanism that may be included within system 10 is a known electronically controllable variable geometry turbocharger turbine 26. In this regard, turbine 26 includes a variable geometry actuator 94 electrically connected to a variable geometry turbocharger control output, VGTC, of control computer 42 via signal path 96. Control computer 42, in one embodiment, is operable to produce a variable geometry turbocharger control signal on signal path 96 in a manner to be more fully described hereinafter, and variable geometry actuator 94 is responsive to this control signal to control the swallowing capacity (i.e., exhaust gas flow capacity) of turbine 26 by controlling the flow geometry of turbine 26 in a known manner.

Another turbocharger swallowing capacity control mechanism that may be included within system 10 is a known electronically controllable exhaust throttle 88 having an exhaust throttle actuator 90 electrically connected to an exhaust throttle control output, EXTC, of control computer 42 via signal path 92. In one embodiment, exhaust throttle 88 is disposed in-line with exhaust conduit 32 as illustrated in FIG. 1, although the present invention contemplates that exhaust throttle 88 may alternatively be disposed in-line with exhaust conduit 32. Control computer 42, in one embodiment, is operable to produce an exhaust throttle control signal on signal path 92 in a manner to be more fully described hereinafter, and exhaust throttle actuator 92 is responsive to this control signal to control the position of exhaust throttle 88 relative to a reference position. The position of exhaust throttle 88 defines a cross-sectional flow area therethrough, and by controlling the cross-sectional flow are of the exhaust throttle 88, control computer 42 is operable to control the flow rate of exhaust gas produced by engine 12, and thus the swallowing capacity (i.e., exhaust gas flow capacity) of turbine 26.

One turbocharger swallowing efficiency control mechanism that may be included within system 10 is a known electronically controllable wastegate valve 82 having a wastegate valve actuator 84 gelectrically connected to an wastegate valve control output, WGC, of control computer 42 via signal path 86. Wastegate valve 82 has an inlet fluidly coupled to exhaust conduit 32, and an outlet fluidly coupled to exhaust conduit 34. In embodiments of system 10 including both a wastegate valve 82 and an exhaust throttle 88, the outlet of wastegate valve 82 may be fluidly coupled to exhaust conduit 32 upstream of exhaust throttle 88 as shown in FIG. 1, or may alternatively be coupled to exhaust conduit 32 downstream of exhaust throttle 88. In either case, control computer 42, in one embodiment, is operable to produce a wastegate valve control signal on signal path 86 in a manner to be more fully described hereinafter, and wastegate valve actuator 84 is responsive to this control signal to control the position of wastegate valve 82 relative to a reference position. The position of wastegate valve 82 defines a cross-sectional flow area therethrough, and by controlling the cross-sectional flow are of the wastegate valve 82, control computer 42 is operable to selectively divert exhaust gas away from turbine 26, and thereby control the swallowing efficiency of turbine 26.

It is to be understood that while FIG. 1 is illustrated as including all of the foregoing turbocharger swallowing capacity/efficiency control mechanisms (i.e., variable geometry turbine 26, exhaust throttle 88 and wastegate valve 82), the present invention contemplates embodiments of system 10 that include any single one, or any combination, of such control mechanisms. Additionally, control computer 42 may be configured, in a manner to be described in detail hereinafter, to control any one or combination of such control mechanisms to thereby control turbocharger swallowing capacity and/or efficiency.

Figure 2:
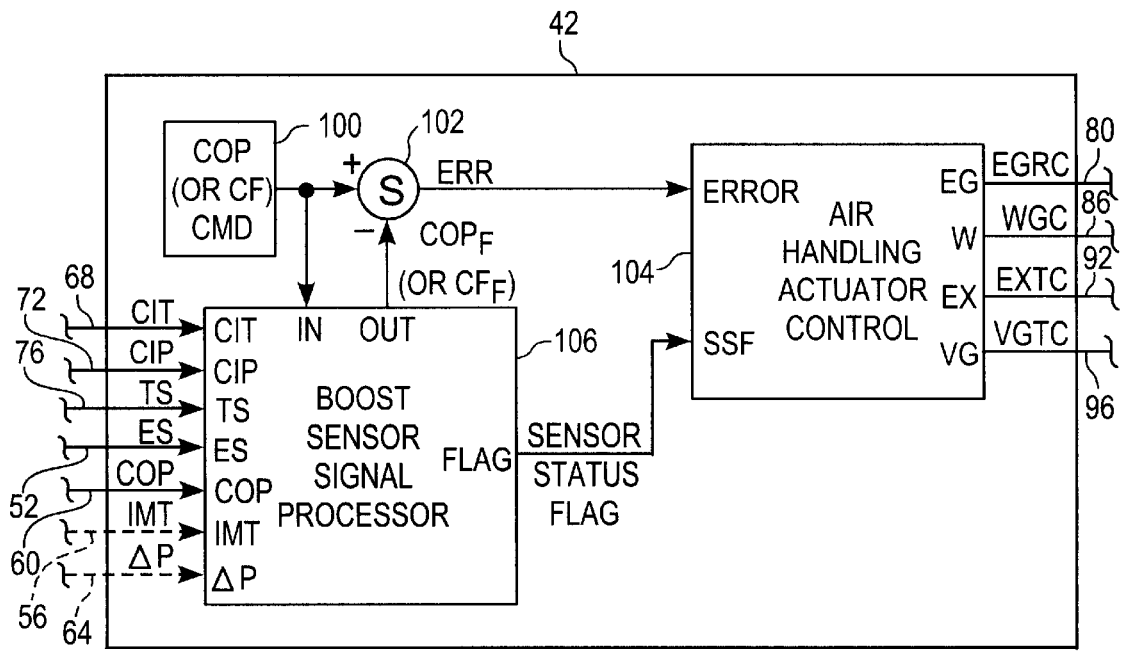
FIG. 2 is a block diagram illustrating one preferred configuration of the control computer of FIG. 1 for accommodating failures associated with one specific engine operating condition sensor, in accordance with the present invention.

Referring now to FIG. 2, a block diagram is shown illustrating one preferred configuration of the control computer 42 of FIG. 1 for accommodating failures associated with one specific engine operating condition sensor; namely the compressor outlet, or boost, pressure sensor 58, in accordance with the present invention. It is to be understood that with respect to FIGS. 2–9, the functional blocks illustrated therein are intended to represent software structures, although those skilled in the art will recognize that such functional blocks may alternatively be implemented with known electronic hardware components. In any case, with respect to FIG. 2, control computer 42 includes a command block 100 having an output connected to a non-inverting input of a summation node 102. In one embodiment, block 100 is operable to produce a compressor outlet pressure command (COP CMD) in a known manner and as a function of one or more engine operating conditions. The compressor outlet pressure command, as is known in the art, represents a desired compressor outlet pressure value. In an alternative embodiment, as will be described in greater detail hereinafter, block 100 is operable to a charge mass flow rate command (CF CMD) in a known manner and as a function of one or more engine operating conditions. The charge mass flow rate command, as is known in the art, represents a desired mass flow rate of air charge entering the intake manifold 14.

The summation node 102 includes an inverting input receiving, in one preferred embodiment, a final compressor outlet pressure value ($COP_F$) produced by a boost sensor signal processor block 106. The summation node 102 is operable to produce an error value (ERR) as a difference between the compressor outlet pressure command, COP CMD, and the final compressor outlet pressure value, $COP_F$, and to provide the error value, ERR, to an error input, ERROR, of an air handling actuator control block 104. Block 104 includes a second input, SSF, receiving a sensor status flag output produced by the boost sensor signal processor block 106, and includes an EGR control output, EG, electrically connected to signal path 80, a wastegate control output, W electrically connected to signal path 86, an exhaust throttle control output, EX, electrically connected to signal path 92, and a variable geometry turbocharger control output, VG, electrically connected to signal path 96.

The boost sensor signal processor block 106 receives as inputs the compressor outlet pressure command, COP CMD, produced by block 100, the compressor inlet temperature signal, CIT, on signal path 68, the compressor inlet pressure signal, CIP, on signal path 72, the turbocharger speed signal, TS, on signal path 76, the engine speed signal, ES, on signal path 52 and the compressor outlet, or boost, pressure signal, COP, on signal path 60. In an alternative embodiment, as shown in phantom in FIG. 2, block 106 may additionally receive as inputs the intake manifold temperature signal, IMT, on signal path 56 and the delta pressure signal, ΔP, on signal path 64. In a manner to be more fully described hereinafter, the boost sensor signal processor block 106 is operable, in one embodiment, to process the foregoing input signals and produce as outputs the final compressor outlet pressure value, $COP_F$, and a compressor outlet pressure sensor status flag. The compressor outlet pressure sensor status flag is supplied to the sensor status flag input, SSF, of the air handling actuator control block 104, and block 104 is responsive to the error signal, ERR, and sensor status flag inputs to control any one or more of the air handling system mechanism actuators (e.g., the EGR valve actuator 78, the wastegate valve actuator 84, the exhaust throttle actuator 90 and/or the VGT actuator 94) in a manner to be fully described hereinafter.

Figure 3:
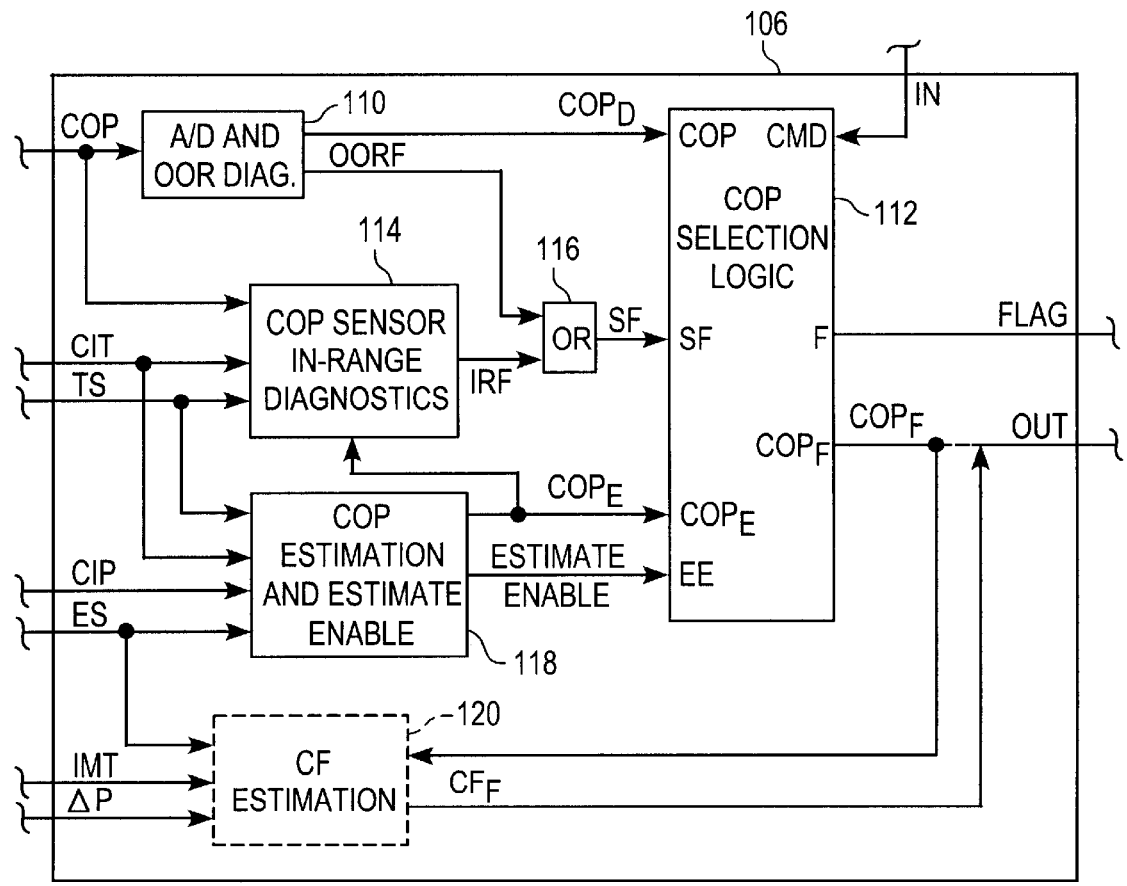
FIG. 3 is a block diagram illustrating one preferred embodiment of the sensor signal processor block of FIG. 2, in accordance with the present invention.

Referring now to FIG. 3, a block diagram illustrating one preferred embodiment of the boost sensor signal processor block 106 of FIG. 2, in accordance with the present invention, is shown. Block 106 includes an analog-to-digital (A/D) converter and sensor out-of-range diagnostics block 110 receiving the compressor outlet, or boost, pressure sensor signal, COP, on signal path 60. Block 110 is operable to convert the analog sensor signal on signal path 60 to a discrete or digital compressor outlet pressure value ($COP_D$), and to provide the digital compressor outlet pressure value, $COP_D$, to a compressor outlet pressure input, COP, of a compressor outlet pressure selection logic block 112. Block 110 is further operable to process the compressor outlet pressure signal, COP, on signal path 60 for determination of an out-of-range failure condition, and to provide a corresponding out-of-range failure flag (OORF) to one input of an OR block 116. In one embodiment, block 110 includes known software for comparing the compressor outlet pressure signal, COP, on signal path 60 to preset low and high signal threshold values. If the compressor outlet pressure signal exceeds the high signal threshold value, or if the compressor outlet pressure signal, COP, falls below the low signal threshold value, the known sensor out-of-range software resident within block 110 sets the out-of-range failure flag, OORF, and otherwise clears the OORF flag.

The boost sensor signal processor block 106 further includes a compressor outlet estimation and estimate enable block 118 receiving as inputs the compressor inlet temperature, CIT, the turbocharger speed, TS, the compressor inlet pressure, CIP, and the engine speed, ES, signals and producing at a first output a compressor outlet pressure estimate, $COP_E$, as a function thereof; i.e., $COP_E$=f(CIT, CIP, TS, ES). Further details relating to one such compressor outlet pressure estimation strategy are described in co-pending U.S. Patent Application Publication No. US2003/0177765 A1, entitled SYSTEM FOR ESTIMATING ABSOLUTE BOOST PRESSURE IN A TURBOCHARGED INTERNAL COMBUSTION ENGINE, which is assigned to the assignee of the present invention, and the disclosure of which is incorporated herein by reference. Those skilled in the art will, however, recognize that other known compressor outlet, intake manifold, or boost, pressure estimation strategies may be used within block 118, and any such alternate compressor outlet pressure estimation strategies are intended to fall within the scope of the present invention.

The boost sensor signal processor block 106 further includes a compressor outlet pressure sensor in-range diagnostics block 114 receiving as inputs the compressor inlet temperature signal, CIT, the turbocharger speed signal, TS, the compressor outlet pressure signal, COP, on signal path 60 and the estimated compressor outlet pressure value, $COP_E$, produced by block 118, and producing as an output an in-range failure flag, IRF. The IRF flag is provided as a second input to OR gate 116.

In one embodiment, block 114 includes an in-range sensor failure model operable to compare a difference between the compressor outlet pressure signal, COP, on signal path 60 and the compressor outlet pressure estimate, $COP_E$, with a diagnostic threshold to determine whether an in-range failure of the compressor outlet pressure sensor 58 exists. In one embodiment, for example, block 114 is operable to compute a residual, or error, R, as a difference between COP and $COP_E$, and compare R with a diagnostic threshold of the form TS/sqrt(CIT). If an absolute value of R is greater than the threshold, an in-range failure is detected and block 114 is operable to set the in-range failure flag, IRF. If, on the other hand, the absolute value of R is less than or equal to the threshold, block 114 is operable to clear the IRF flag. Further details relating to one such sensor in-range diagnostic strategy are described in U.S. Pat. No. 6,298,718, which is assigned to the assignee of the present invention, and the disclosure of which is incorporated herein by reference. Those skilled in the art will, however, recognize that other known sensor in-range diagnostic strategies may be used within block 114, and any such alternate sensor in-range diagnostic strategies are intended to fall within the scope of the present invention.

The COP estimation block 118 is further preferably operable to conduct in-range and/or out-of-range sensor diagnostics, such as of the type just described, with regard to the outputs of each physical sensor used by block 118 to compute the compressor outlet pressure estimate, $COP_E$. If any one or more such sensors exhibit in-range and/or out-of-range failures, or other sensor failures, block 118 is operable to clear an estimate enable flag, EE, and if all such sensors are operating normally block 118 is operable to set the estimate enable flag, EE.

The output of OR gate 116 represents a sensor failure flag, SF, indicative of whether an in-range or out-of-range failure exists with respect to the compressor outlet pressure sensor 58, and is provided to a sensor failure input, SF, of the COP selection logic block 112. The compressor outlet pressure estimate, $COP_E$, and estimate enable flag, EE, produced by block 118 are likewise provide to compressor outlet pressure estimate, $COP_E$ and estimate enable, EE, inputs respectively of COP selection logic block 112, and the COP CMD value produced by block 100 is provided to a CMD input of block 112. Block 112 is operable to process the various input signals and produce the final compressor outlet pressure value, $COP_F$, at output OUT of block 106, and to produce a flag value at output FLAG of block 106, indicative of the source of the final compressor outlet pressure value, $COP_F$, in a manner to be fully described hereinafter.

Figure 4:
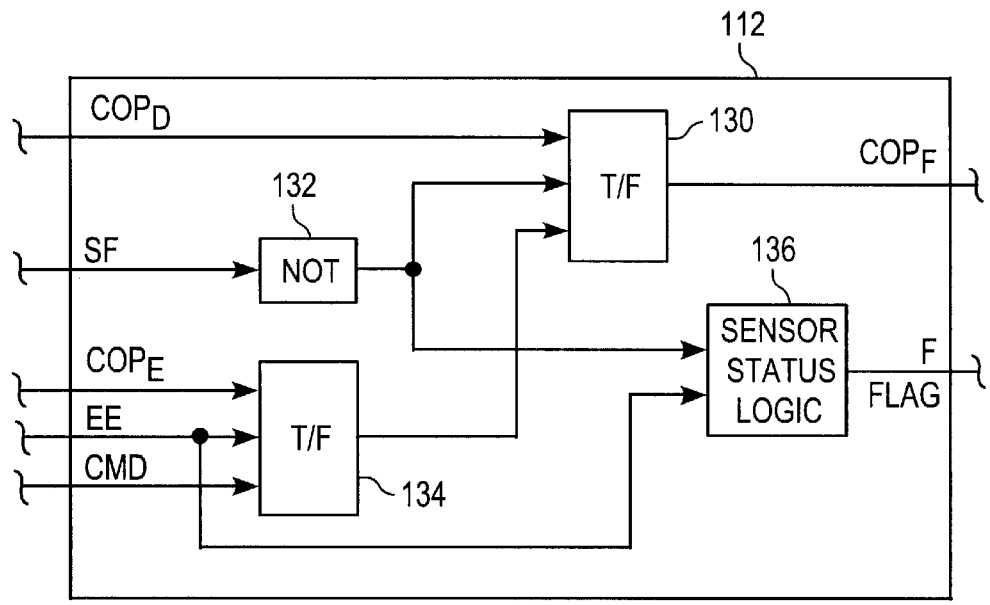
FIG. 4 is a block diagram illustrating one preferred embodiment of the selection logic block of FIG. 3, in accordance with the present invention.

Referring now to FIG. 4, one preferred embodiment of the COP selection logic block 112 of FIG. 3, in accordance with the present invention, is shown. Block 112 includes a true/false block 130 having a "true" input receiving the digital compressor outlet pressure value, $COP_D$, a control input receiving the inverse of the sensor flag value, SF, from NOT block 132, and a "false" output receiving the output of another true/false block 134. The output of true/false block 130 defines the final compressor outlet pressure value, $COP_F$.

True/false block 34 has a "true" input receiving the estimated compressor outlet pressure value, $COP_E$, a control input receiving the estimate enable value, EE, and a "false" input receiving the compressor outlet pressure command value, COP CMD, produced by block 100. The inverted sensor failure signal, SF, produced by block 132 and the estimate enable value, EE, are each provided as inputs to a sensor status logic block 136 having an output defining the flag value, FLAG.

With reference to FIGS. 3 and 4, the operation of the boost sensor signal processor block 106 will now be described in detail. True/false block 130 determines the final compressor outlet pressure value, $COP_F$, as a function of the sensor failure flag, SF. If the compressor outlet, or boost, pressure sensor 58 exhibits neither an out-of-range failure nor an in-range failure, the sensor failure flag, SF, produced by OR block 116 will be "false", and the control input to true/false block 130 will therefore be "true." Block 130 will accordingly produce the digital compressor outlet pressure value, $COP_D$, as the final compressor outlet pressure value, $COP_F$. On the other hand, if the compressor outlet, or boost, pressure sensor 58 exhibits either an out-of-range failure or an in-range failure, the sensor failure flag, SF, produced by OR block 116 will be "true", and the control input to true/false block 130 will therefore be "false." In this case, true/false block 130 will produce as the final compressor outlet pressure value, $COP_F$, either the estimated compressor outlet pressure value, $COP_E$, or the commanded compressor outlet pressure value, COP CMD, from true/false block 134, depending upon the status of the estimate enable flag, EE. If each of the sensors producing a signal used by the COP estimation block 118 in determining the compressor outlet pressure estimate, $COP_E$, are error free, the EE flag will be "true", and true/false block 134 will accordingly produce the estimated compressor outlet pressure value, $COP_E$, as its output. In this case, true/false block 130 will produce as its output the estimated compressor outlet pressure value, $COP_E$, as long as the control input to block 130 is "false" (i.e., the sensor failure flag, SF, is set). On the other hand, if any one of the sensors producing a signal used by the COP estimation block in determining the compressor outlet pressure estimate, $COP_E$, exhibits a sensor error as described hereinabove, the EE flag will be "false", and true/false block 34 will accordingly produce the commanded compressor outlet pressure value, COP CMD, as its output. In this case, true/false block 130 will produce as its output the commanded compressor outlet pressure value, COP CMD, as long as the control input to block 130 is "false" (i.e., the sensor failure flag, SF, is set).

The sensor status logic block 136 produces the status flag, FLAG, indicative of the source of the final compressor outlet pressure value, $COP_F$. In one embodiment, block 136 is implemented as a table mapping the inverse of the sensor flag, SF, and the estimate enable flag, EE, to appropriate values of the status flag, FLAG. An example of one such table is set forth below as Table 1:

TABLE 1

| EE | SF | FLAG |
|---|---|---|
| FALSE | FALSE | $COP_D$ |
| FALSE | TRUE | COP CMD |
| TRUE | FLASE | $COP_D$ |
| TRUE | TRUE | $COP_E$ |

It is to be understood that in the compressor outlet pressure selection logic block 112, the COP CMD input to true/false block 34 is provided only by way of example, and this input may be replaced in other embodiments with a general compressor outlet pressure value. The general compressor outlet pressure value may be a predefined constant or a function of one or more engine operating conditions.

Figure 5:
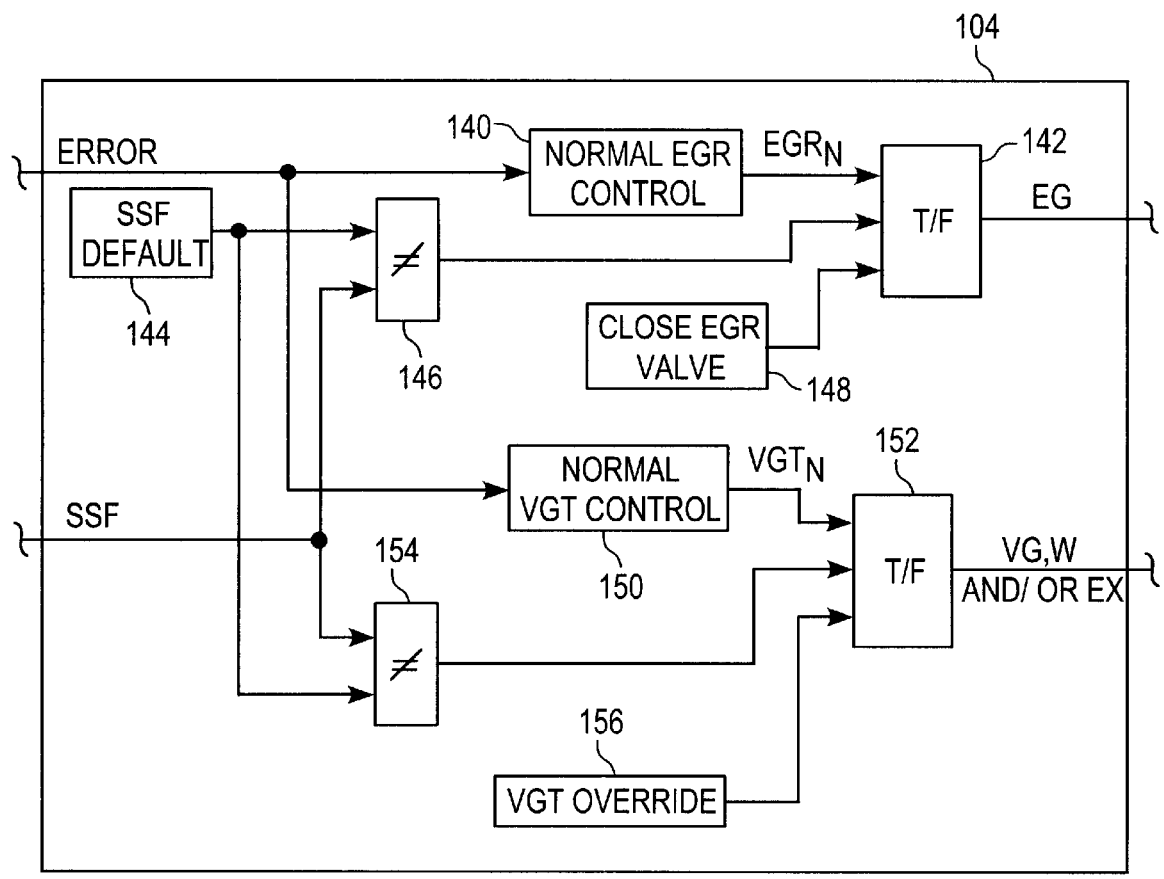
FIG. 5 is a block diagram illustrating one preferred embodiment of the air handling actuator control block of FIG. 2, in accordance with the present invention.

Referring now to FIG. 5, one preferred embodiment of the air handling actuator control block 104 of FIG. 2, in accordance with the present invention, is shown. Block 104 includes a normal EGR control block 140 receiving the error signal, ERR, produced by summation node 102 (FIG. 2), wherein ERR corresponds to a difference between the commanded compressor outlet pressure value, COP CMD, produced by block 100, and the final compressor outlet pressure value, $COP_F$, produced by block 106. The normal EGR control block 140 includes known software for producing a normal EGR control signal, $EGR_N$, as a function of the error signal, ERR, in a conventional manner. The normal EGR control signal, $EGR_N$, is provided to a "true" input of a true/false block 142.

A sensor status flag default block 144 produces as an output the commanded compressor outlet pressure value, COP CMD, which is received as one input of an inequality block 146. A second input of inequality block 146 receives the sensor status flag value, FLAG, produced by the sensor status logic block 136 (FIG. 4), and the output of inequality block 146 is directed to the control input of true/false block 142. The "false" input of true/false block 142 receives a "close EGR valve" or other suitable EGR valve command from block 148, and the output of true/false block 142 defines the EGR control output of control computer 42. In operation, as long as the sensor status flag, FLAG, produced by sensor status logic block 136 does not indicate that the source of the final compressor outlet pressure value, $COP_F$ is the commanded compressor outlet pressure value, COP CMD, true/false block 142 produces at the EGR control output, EGRC, of control computer 42 the normal EGR control signal, $EGR_N$. If, on the other hand, the sensor status flag, FLAG, produced by sensor status logic block 136 indicates that the source of the final compressor outlet pressure value, $COP_F$, is the commanded compressor outlet pressure value, COP CMD, true/false block 142 produces at the EGR control output, EGRC, of control computer 42 the EGR control command produced by block 148; e.g., a command to close the EGR valve 36. Thus, as long as the final compressor outlet pressure value, $COP_F$, corresponds to either the digitized compressor outlet pressure sensor signal, $COP_D$, or the estimated compressor outlet pressure value, $COP_E$, block 104 is operable to control the EGR valve 36 in accordance with conventional EGR valve control based on the error value ERR. However, if both of the digitized compressor outlet pressure sensor signal, $COP_D$, and the estimated compressor outlet pressure value, $COP_E$, are unreliable as a result of one or more sensor failures, block 104 is operable to command the EGR valve 36 to a closed position.

Block 104 further includes a normal VGT control block 150 receiving the error signal, ERR, produced by summation node 102 (FIG. 2). The normal VGT control block 150 includes known software for producing a normal VGT control signal, $VGT_N$, as a function of the error signal, ERR, in a conventional manner. The normal VGT control signal, $VGT_N$, is provided to a "true" input of a true/false block 152. Sensor status flag default block 144 provides the commanded compressor outlet pressure value, COP CMD, to one input of another inequality block 154. A second input of inequality block 154 receives the sensor status flag value, FLAG, produced by the sensor status logic block 136 (FIG. 4), and the output of inequality block 154 is directed to the control input of true/false block 152. The "false" input of true/false block 152 receives a predefined VGT command from VGT override block 156, and the output of true/false block 152 defines any one or more of the turbocharger control outputs of control computer 42, VGTC, WGC and/or EXTC.

In operation, as long as the sensor status flag, FLAG, produced by sensor status logic block 136 does not indicate that the source of the final compressor outlet pressure value, $COP_F$, is the commanded compressor outlet pressure value, COP CMD, true/false block 152 produces at its output the normal VGT control signal, $VGT_N$. If, on the other hand, the sensor status flag, FLAG, produced by sensor status logic block 136 indicates that the source of the final compressor outlet pressure value, $COP_F$ is the commanded compressor outlet pressure value, COP CMD, true/false block 142 produces at its output the predefined VGT command produced by VGT override block 156.

It is to be understood that the foregoing terms "normal VGT control", "VGTN", "predefined VGT command" and "VGT override block" represent generalized terms for controlling the swallowing capacity and/or swallowing efficiency of the turbocharger turbine 26 as described hereinabove, and that these generalized terms apply equally to the control of any one, or combination of, the wastegate actuator 84, the exhaust throttle actuator 90 and/or the variable geometry turbine actuator 94. Thus, the functional blocks of the air handling actuator control block 104 just described with respect to FIG. 5 may be used to effectuate compressor outlet, or boost, pressure control via control of any one or more of the variable geometry turbocharger turbine 26, the wastegate 82 and/or the exhaust throttle 88. In any case, as long as the final compressor outlet pressure value, $COP_F$, corresponds to either the digitized compressor outlet pressure sensor signal, $COP_D$, or the estimated compressor outlet pressure value, $COP_E$, block 104 is operable to control an appropriate one or more of the actuators 84, 90 and/or 94 in accordance with conventional VGT control based on the error value ERR. However, if both of the digitized compressor outlet pressure sensor signal, $COP_D$, and the estimated compressor outlet pressure value, $COP_E$, are unreliable as a result of one or more sensor failures, block 104 is operable to control an appropriate one or more of the actuators 84, 90 and/or 94 in accordance with the predefined VGT command produced by the VGT override block 156.

Referring again to FIGS. 2 and 3, the present invention recognizes that in some conventional systems the compressor outlet pressure signal, COP, produced by sensor 58 may not be used to directly control one or more of the air handling actuators 78, 84, 90 and/or 94. Rather, in some systems, the compressor outlet pressure signal, COP, produced by sensor 58 is used to compute or estimate another engine operating condition that is then used to directly control one or more of the air handling actuators 78, 84, 90 and/or 94. For example, the compressor outlet, or boost, pressure signal, COP, produced by sensor 58 may be used to compute or estimate a charge flow value, CF, corresponding to the mass flow rate of air charge supplied to the intake manifold 14, and control computer 42 is configured to control air handling actuators 78, 84, 90 and/or 94 not as a direct function of compressor outlet pressure, COP, but instead as a direct function of charge flow, CF. Accordingly, block 106 (FIG. 3) may alternatively or additionally include a charge flow estimation block 120, as shown in phantom, receiving as inputs the engine speed signal, ES, on signal path 52, the intake manifold temperature, IMT, on signal path 56, the differential pressure signal, ΔP, on signal path 64, and the final compressor outlet pressure value, $COP_F$, produced by COP selection block 112. Block 120 is operable to estimate a charge flow value, CF, corresponding to the mass flow of air charge supplied to the intake manifold 14, as a function of its input values, and produce as the output OUT of the boost sensor signal processor block 106 a final charge flow value, $CF_F$. In this embodiment, block 100 includes a commanded charge flow value, CF CMD, or is operable to convert the COP CMD value to the CF CMD value, such that the error value ERR produced by summation node 102 is a difference between the commanded charge flow value, CF CMD, and the final charge flow value, $CF_F$. The air handling actuator control block 104 is then operable as described hereinabove to effectuate air handling actuator control.

It is to be understood that the term "charge" as used herein, is defined as a composition of fresh air and recirculated exhaust gas. In any case, the charge flow estimation block 120 is operable to compute an estimate of the mass flow rate of charge supplied to the intake manifold 14 by first estimating the volumetric efficiency ($\eta_V$) of the charge intake system, and then computing $CF_F$ as a function of $\eta_V$ using a conventional speed/density equation. Any known technique for estimating $\eta_V$ may be used, and in one preferred embodiment of block 120 $\eta_V$ is computed according to a known Taylor mach number-based volumetric efficiency equation given as:

$$\eta_V = A_1 * \{(Bore/D)^2 * (stroke*ES)^B / sqrt(\gamma*R*IMT) * [(1+EP/COP_F) + A_2]\} + A_3,$$

where, $A_1$, $A_2$, $A_3$ and B are all calibratable parameters preferably fit to the volumetric efficiency equation based on mapped engine data, Bore is the intake valve bore length, D is the intake valve diameter, stroke is the piston stroke length, wherein Bore, D and stroke are generally dependent upon engine geometry, γ and R are known constants (e.g., γ*R=387.414 KJ/kg/deg K), ES is engine speed, $COP_F$ is the final compressor outlet pressure value, EP is the exhaust pressure, where $EP=COP_F+\Delta P$, and IMT=intake manifold temperature.

With the volumetric efficiency value $\eta_V$ estimated according to the foregoing equation, the estimated final charge flow value $CF_F$ is preferably computed according to the equation:

$$CF_F = \eta_V * V_{DIS} * ES * COP_F / (2*R*IMT),$$

where, $\eta_V$ is the estimated volumetric efficiency, $V_{DIS}$ is engine displacement and is generally dependent upon engine geometry, and R is a known gas constant (e.g., R=54).

Figure 6:
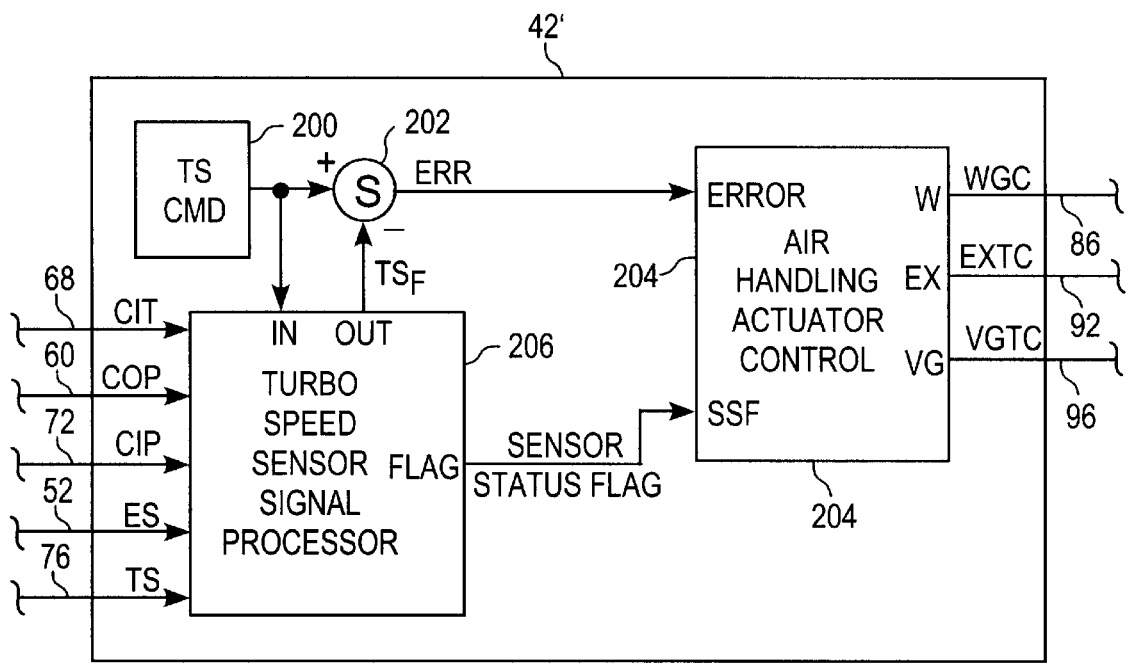
FIG. 6 is a block diagram illustrating an alternate configuration of the control computer of FIG. 1 for accommodating failures associated with another specific engine operating condition sensor, in accordance with the present invention.

Referring now to FIG. 6, a block diagram is shown illustrating an alternate configuration 42' of the control computer 42 of FIG. 1 for accommodating failures associated with another specific engine operating condition sensor; namely the turbocharger speed sensor 74, in accordance with the present invention. With respect to FIG. 6, control computer 42' includes a command block 200 having an output connected to a non-inventing input of a summation node 202. Block 200 is operable to produce a turbocharger speed command (TS CMD) in a known manner and as a function of one or more engine operating conditions. The turbocharger speed command, TS CMD, as is known in the art, represents a desired turbocharger rotational speed value. The summation node 202 also includes an inverting input receiving a final turbocharger speed value ($TS_F$) produced by a turbocharger speed sensor signal processor block 206. The summation node 102 is operable to produce an error value (ERR) as a difference between the turbocharger speed command, TS CMD, and the final turbocharger speed value, $TS_F$, and to provide the error value, ERR, to an error input of an air handling actuator control block 204. Block 204 includes a second input, SSF, receiving a sensor status flag output from the turbocharger speed sensor signal processor block 206, and includes a wastegate control output, W electrically connected to signal path 86, an exhaust throttle control output, EX, electrically connected to signal path 92, and a variable geometry turbocharger control output, VG, electrically connected to signal path 96.

The turbocharger speed sensor signal processor block 206 receives as inputs the turbocharger speed command, TS CMD, produced by block 200, the compressor inlet temperature signal, CIT, on signal path 68, the compressor outlet pressure signal, COP, on signal path 60, the compressor inlet pressure signal, CIP, on signal path 72, the engine speed signal, ES, on signal path 52 and the turbocharger speed signal, TS, produced by the turbocharger speed sensor 74 on signal path 76. In a manner to be more fully described hereinafter, the turbocharger speed sensor signal processor block 206 is operable to process the foregoing input signals and produce as outputs the final turbocharger speed value, $TS_F$, and a turbocharger speed sensor status flag, FLAG. The turbocharger speed sensor status flag, FLAG, is supplied to a sensor status flag input, SSF, of the air handling actuator control block 204, and block 204 is responsive to the error signal, ERR, and sensor status flag, FLAG, inputs to control any one or more of the turbocharger air handling system mechanism actuators (e.g., the wastegate valve actuator 84, the exhaust throttle actuator 90 and/or the VGT actuator 94) in a manner to be fully described hereinafter.

Figure 7:
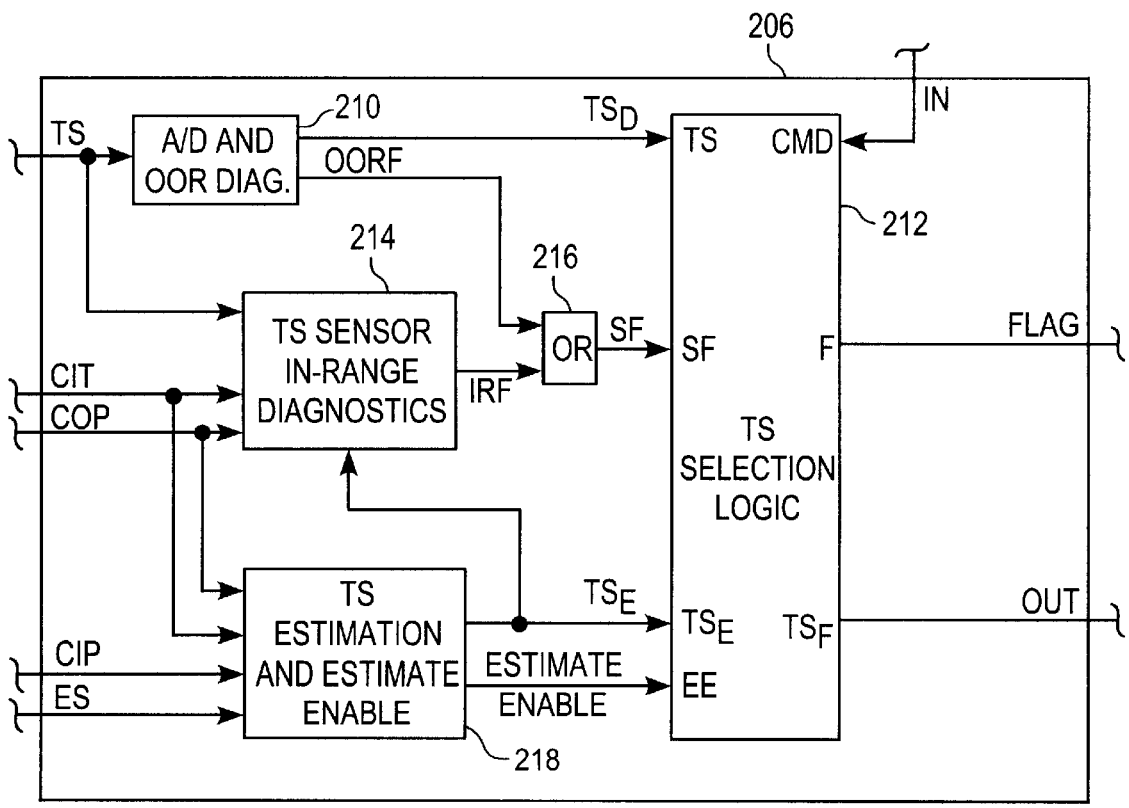
FIG. 7 is a block diagram illustrating one preferred embodiment of the sensor signal processor block of FIG. 6, in accordance with the present invention.

Referring now to FIG. 7, a block diagram illustrating one preferred embodiment of the turbocharger speed sensor signal processor block 206 of FIG. 6, in accordance with the present invention, is shown. Block 206 includes an analog-to-digital (A/D) converter and sensor out-of-range diagnostics block 210 receiving the turbocharger speed sensor signal, TS, on signal path 76. Block 210 is operable to convert the analog sensor signal on signal path 76 to a discrete or digital turbocharger speed value ($TS_D$), and to provide the digital turbocharger speed value, $TS_D$, to a turbocharger speed input, TS, of a turbocharger speed selection logic block 212. Block 210 is further operable to process the turbocharger speed signal, TS, on signal path 76 for determination of an out-of-range failure condition, and to provide a corresponding out-of-range failure flag (OORF) to one input of an OR block 216. In one embodiment, block 210 includes known software for comparing the turbocharger speed signal, TS, on signal path 76 to preset low and high signal threshold values. If the turbocharger speed signal, TS, on signal path 76 exceeds the high signal threshold value, or if the turbocharger speed signal, TS, falls below the low signal threshold value, the known sensor out-of-range software resident within block 210 sets the out-of-range failure flag, OORF, and otherwise clears the OORF flag.

The boost sensor signal processor block 206 further includes a turbocharger speed estimation and estimate enable block 218 receiving as inputs the compressor inlet temperature, CIT, the compressor inlet pressure, CIP, the compressor outlet pressure, COP, and the engine speed, ES, signals and producing at a first output a turbocharger speed estimate, $TS_E$, as a function thereof; i.e., TSE=f(CIT, CIP, COP, ES). Further details relating to one such turbocharger speed estimation strategy are described in U.S. Pat. No. 6,539,714, which is assigned to the assignee of the present invention, and the disclosure of which is incorporated herein by reference. Those skilled in the art will, however, recognize that other known turbocharger speed estimation strategies may be used within block 218, and any such alternate turbocharger speed estimation strategies are intended to fall within the scope of the present invention.

The boost sensor signal processor block 206 further includes a turbocharger speed sensor in-range diagnostics block 214 receiving as inputs the compressor inlet temperature signal, CIT, the turbocharger speed signal, TS, on signal path 76, the compressor outlet pressure signal, COP, on signal path 60 and the estimated turbocharger speed value, $TS_E$, produced by block 218, and producing as an output an in-range failure flag, IRF. The IRF flag is provided as a second input to OR gate 216.

In one embodiment, block 214 includes an in-range sensor failure model operable to compare a difference between the turbocharger speed signal, TS, on signal path 76 and the turbocharger speed estimate, $TS_E$, with a diagnostic threshold to determine whether an in-range failure of the turbocharger speed sensor 74 exists. In one embodiment, for example, block 214 is operable to compute a residual, or error, R, as a difference between TS and $TS_E$, and compare R with a diagnostic threshold of the form COP/sqrt(CIT). If an absolute value of R is greater than the threshold, an in-range failure is detected and block 214 is operable to set the in-range failure flag, IRF. If, on the other hand, the absolute value of R is less than or equal to the threshold, block 214 is operable to clear the IRF flag. Further details relating to a similar sensor in-range diagnostic strategy are described in U.S. Pat. No. 6,298,718, which has been incorporated herein by reference. Those skilled in the art will, however, recognize that other known sensor in-range diagnostic strategies may be used within block 214, and any such alternate sensor in-range diagnostic strategies are intended to fall within the scope of the present invention.

The turbocharger speed estimation block 218 is further operable to conduct in-range and/or out-of-range sensor diagnostics, such as of the type just described, with regard to the outputs of each physical sensor used by block 218 to compute the turbocharger speed estimate, $TS_E$. If any one or more such sensors exhibit in-range and/or out-of-range failures, or other sensor failures, block 218 is operable to clear an estimate enable flag, EE, and if all such sensors are operating normally, block 218 is operable to set the estimate enable flag, EE.

The output of OR gate 216 represents a sensor failure flag, SF, indicative of whether an in-range or out-of-range failure exists with respect to the turbocharger speed sensor 74, and is provided to a sensor failure input, SF, of the turbocharger speed selection logic block 212. The turbocharger speed estimate, $TS_E$, and estimate enable flag, EE, produced by block 218 are likewise provide to turbocharger speed estimate, $TS_E$ and estimate enable, EE, inputs respectively of turbocharger speed selection logic block 212, and the TS CMD value produced by block 200 is provided to a CMD input of block 212. Block 212 is operable to process the various input signals and produce the final turbocharger speed value, $TS_F$, at output OUT of block 206, and to produce a flag value at output FLAG of block 206, indicative of the source of the final turbocharger speed value, $TS_F$, in a manner to be fully described hereinafter.

Figure 8:
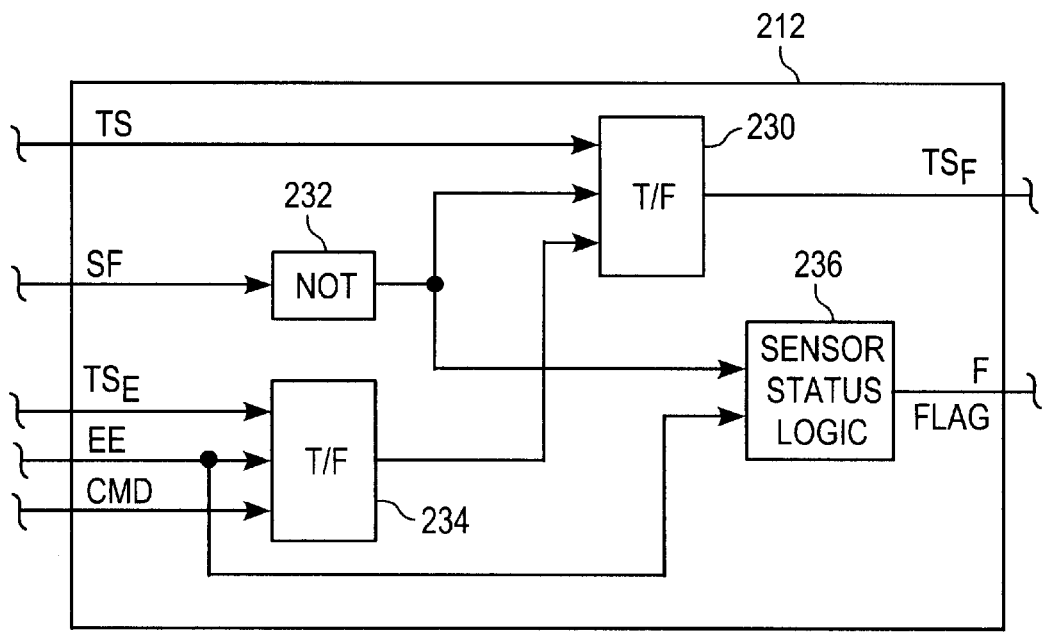
FIG. 8 is a block diagram illustrating one preferred embodiment of the selection logic block of FIG. 7, in accordance with the present invention.

Referring now to FIG. 8, one preferred embodiment of the turbocharger speed selection logic block 212 of FIG. 7, in accordance with the present invention, is shown. Block 212 includes a true/false block 230 having a "true" input receiving the digital turbocharger speed value, $TS_D$, a control input receiving the inverse of the sensor flag value, SF, from NOT block 232, and a "false" output receiving the output of another true/false block 234. The output of true/false block 230 defines the final turbocharger speed value, $TS_F$.

True/false block 234 has a "true" input receiving the estimated turbocharger speed value, $TS_E$, a control input receiving the estimate enable value, EE, and a "false" input receiving the turbocharger speed command value, TS CMD, produced by block 200. The inverted sensor failure signal, SF, produced by block 232 and the estimate enable value, EE, are each provided as inputs to a sensor status logic block 236 having an output defining the flag value, FLAG.

With reference to FIGS. 7 and 8, the operation of the turbocharger speed sensor signal processor block 206 will now be described in detail. True/false block 230 determines the final turbocharger speed value, $TS_F$, as a function of the sensor failure flag, SF. If the turbocharger speed sensor 74 exhibits neither an out-of-range failure nor an in-range failure, the sensor failure flag, SF, produced by OR block 216 will be "false", and the control input to true/false block 230 will therefore be "true." Block 230 will accordingly produce the digital turbocharger speed value, $TS_D$, as the final turbocharger speed value, $TS_F$. On the other hand, if the turbocharger speed sensor 74 exhibits either an out-of-range failure or an in-range failure, the sensor failure flag, SF, produced by OR block 216 will be "true", and the control input to true/false block 230 will therefore be "false." In this case, true/false block 230 will produce as the turbocharger speed value, $TS_F$, either the estimated turbocharger speed value, $TS_E$, or the commanded turbocharger speed value, TS CMD, from true/false block 234, depending upon the status of the estimate enable flag, EE. If each of the sensors producing a signal used by the turbocharger speed estimation block 218 in determining the turbocharger speed estimate, $TS_E$, are error free, the EE flag will be "true", and true/false block 234 will accordingly produce the estimated turbocharger speed value, $TS_E$, as its output. In this case, true/false block 230 will produce as its output the estimated turbocharger speed value, $TS_E$, as long as the control input to block 230 is "false" (i.e., the sensor failure flag, SF, is set). On the other hand, if any one of the sensors producing a signal used by the turbocharger speed estimation block 218 in determining the turbocharger speed estimate, $TS_E$, exhibits a sensor error as described hereinabove, the EE flag will be "false", and true/false block 234 will accordingly produce the commanded turbocharger speed value, TS CMD, as its output. In this case, true/false block 230 will produce as its output the commanded turbocharger speed value, TS CMD, as long as the control input to block 230 is "false" (i.e., the sensor failure flag, SF, is set).

The sensor status logic block 236 produces the status flag, FLAG, indicative of the source of the final turbocharger speed value, $TS_F$. In one embodiment, block 236 is implemented as a table mapping the inverse of the sensor flag, SF, and the estimate enable flag, EE, to appropriate values of the status flag, FLAG. An example of one such table is set forth below in Table 2:

TABLE 2

| EE | SF | FLAG |
|---|---|---|
| FALSE | FLASE | $TS_D$ |
| FALSE | TRUE | TS CMD |
| TRUE | FLASE | $TS_D$ |
| TRUE | TRUE | $TS_E$ |

It is to be understood that in the turbocharger speed selection logic block 212, the TS CMD input to true/false block 234 is provided only by way of example, and this input may be replaced in other embodiments with a general turbocharger speed value. The general turbocharger speed value may be a predefined constant or a function of one or more engine operating conditions.

Figure 9:
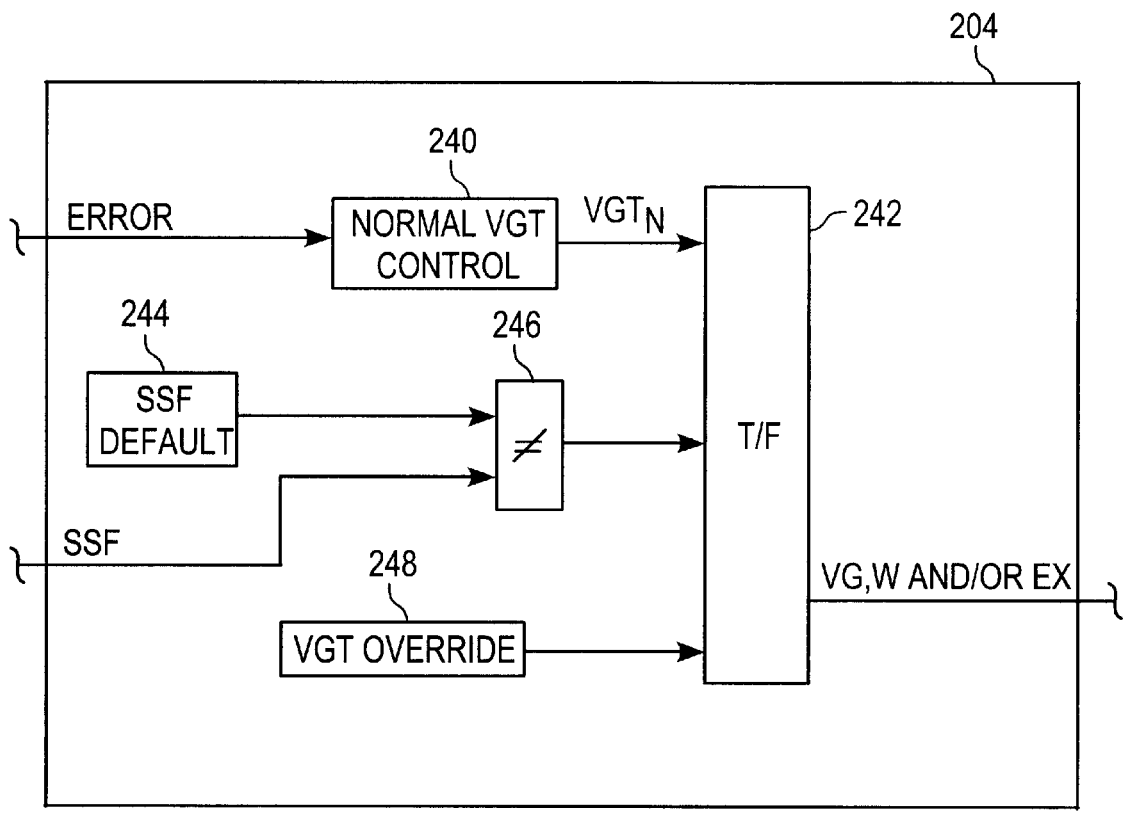
FIG. 9 is a block diagram illustrating one preferred embodiment of the air handling actuator control block of FIG. 6, in accordance with the present invention.

Referring now to FIG. 9, one preferred embodiment of the air handling actuator control block 204 of FIG. 6, in accordance with the present invention, is shown. Block 204 includes a normal VGT control block 240 receiving the error signal, ERR, produced by summation node 202 (FIG. 6). The normal VGT control block 240 includes known software for producing a normal VGT control signal, $VGT_N$, as a function of the error signal, ERR, in a conventional manner. The normal VGT control signal, $VGT_N$, is provided to a "true" input of a true/false block 242. Sensor status flag default block 244 provides the commanded turbocharger speed value, TS CMD, to one input of an inequality block 246. A second input of inequality block 246 receives the sensor status flag value, FLAG, produced by the sensor status logic block 236 (FIG. 8), and the output of inequality block 246 is directed to the control input of true/false block 242. The "false" input of true/false block 242 receives a predefined VGT command from VGT override block 248, and the output of true/false block 242 defines any one or more of the turbocharger control outputs of control computer 42', VGTC, WGC and/or EXTC.

In operation, as long as the sensor status flag, FLAG, produced by sensor status logic block 236 does not indicate that the source of the final turbocharger speed value, $TS_f$ is the commanded turbocharger speed value, TS CMD, true/false block 242 produces at its output the normal VGT control signal, $VGT_N$. If, on the other hand, the sensor status flag, FLAG, produced by sensor status logic block 236 indicates that the source of the final turbocharger speed value, $TS_f$ is the commanded turbocharger speed value, TS CMD, true/false block 242 produces at its output the predefined VGT command produced by VGT override block 248.

It is to be understood that the foregoing terms "normal VGT control", "$VGT_N$", "predefined VGT command" and "VGT override block" represent generalized terms for controlling the swallowing capacity and/or swallowing efficiency of the turbocharger turbine 26 as described hereinabove, and that these generalized terms apply equally to the control of any one, or combination of, the wastegate actuator 84, the exhaust throttle actuator 90 and/or the variable geometry turbine actuator 94. Thus, the functional blocks of the air handling actuator control block 204 just described with respect to FIG. 9 may be used to effectuate turbocharger speed control via control of any one or more of the variable geometry turbocharger turbine 26, the wastegate 82 and/or the exhaust throttle 88. In any case, as long as the final turbocharger speed value, $TS_F$, corresponds to either the digitized turbocharger speed sensor signal, $TS_D$, or the estimated turbocharger speed value, $TS_E$, block 204 is operable to control an appropriate one or more of the actuators 84, 90 and/or 94 in accordance with conventional VGT control based on the error value ERR. However, if both the digitized turbocharger speed sensor signal, $TS_D$, and the estimated turbocharger speed value, $TS_E$, are unreliable as a result of one or more sensor failures, block 204 is operable to control an appropriate one or more of the actuators 84, 90 and/or 94 in accordance with the predefined VGT command produced by the VGT override block 248.

While the invention has been illustrated and described in detail in the foregoing drawings and description, the same is to be considered as illustrative and not restrictive in character, it being understood that only preferred embodiments thereof have been shown and described and that all changes and modifications that come within the spirit of the invention are desired to be protected.

What is claimed is:

1. System for accommodating sensor failure in the operation of an internal combustion engine, the system comprising:
   a sensor producing a first engine operating condition signal indicative of a first engine operating condition;
   means for determining whether said sensor exhibits an in-range failure;
   means for determining whether said sensor exhibits an out-of-range failure;

means for setting a failure flag if said sensor exhibits either of said in-range failure and said out-of-range failure, and otherwise clearing said failure flag;

means for estimating said first engine operating condition as a function of a number of engine operating parameters different than said first engine operating condition and producing a corresponding first engine operating condition estimate; and means for producing a first engine operating condition value indicative of said first engine operating condition, said first engine operating condition value corresponding to said first engine operating condition estimate if said failure flag is set and corresponding to said first engine operating condition signal if said failure flag is cleared.

2. System for accommodating sensor failure in the operation of an internal combustion engine, the system comprising:

a sensor producing a first engine operating condition signal indicative of a first engine operating condition; and a control computer setting a failure flag if said sensor exhibits either of an in-range failure and an out-of-range failure and otherwise clearing said failure flag, said control computer estimating said first engine operating condition as a function of a number of engine operating parameters different than said first engine operating condition and producing a corresponding first engine operating condition estimate, said control computer producing a first engine operating condition value indicative of said first engine operating condition, said first engine operating condition value corresponding to said first engine operating condition estimate if said failure flag is set and corresponding to said first engine operating condition signal if said failure flag is cleared.

3. System for accommodating sensor failure in the operation of an internal combustion engine, the system comprising:

a sensor producing an engine operating condition signal indicative of an engine operating condition; and a control computer producing a commanded engine operating condition value corresponding to a desired value of said engine operating condition, said control computer estimating said engine operating condition as a function of a number of engine operating parameters different than said engine operating condition and producing a corresponding engine operating condition estimate, said control computer determining whether a sensor producing any of said number of engine operating parameters different than said engine operating condition has failed, said control computer producing an engine operating condition value indicative of said engine operating condition, wherein said engine operating condition value corresponds to said engine operating condition estimate if only said sensor producing said engine operating command signal has failed, said engine operating condition value corresponds to said commanded engine operating condition value if said sensor producing said engine operating command signal has failed and said sensor producing any of said number of engine operating parameters has also failed, and said engine operating condition value corresponds to said engine operating condition signal if neither of said sensor producing said engine operating command signal and said sensor producing any of said number of engine operating parameters has failed.

4. The system of claim 3 further including an actuator responsive to an actuator command to control an air handling mechanism associated with the engine;

wherein said control computer is configured to produce an error value as a difference between said commanded engine operating condition value and said engine operating condition value, said control computer producing said actuator command as a function of said error value if said engine operating condition value corresponds to either of said engine operating condition signal and said engine operating condition estimate, and otherwise producing a predefined command as said first actuator command.

5. The system of claim 4 further including a turbocharger having a compressor fluidly coupled to an intake manifold of the engine via a first conduit and a turbine fluidly coupled to an exhaust manifold of the engine via a second conduit;

and wherein said engine operating condition is pressure within said first conduit, and said sensor producing said first engine operating condition signal is a first pressure sensor producing a first pressure signal indicative of said pressure within said first conduit.

6. The system of claim 5 further including:

a temperature sensor producing a temperature signal indicative of air temperature entering an inlet of said compressor;

a second pressure sensor producing a second pressure signal indicative of air pressure entering said inlet of said compressor;

a first speed sensor producing a first speed signal indicative of rotational speed of said turbocharger; and a second speed sensor producing a second speed signal indicative of rotational speed of the engine;

and wherein said control computer is configured to estimate said pressure within said first conduit as a function of said temperature signal, said second pressure signal, said first speed signal and said second speed signal.

7. The system of claim 5 further including an EGR valve having an inlet fluidly coupled to said exhaust manifold and an outlet fluidly coupled to said intake manifold;

and wherein said actuator is responsive to said actuator command to control a position of said EGR valve relative to a reference position to thereby selectively direct exhaust gas from said exhaust manifold to said intake manifold;

and wherein said predefined command corresponds to an EGR valve closed command.

8. The system of claim 5 wherein said turbine is a variable geometry turbine;

and wherein said actuator is responsive to said actuator command to control the geometry of said turbine to thereby selectively control a swallowing capacity of said turbine;

and wherein said predefined command corresponds to a predefined turbine swallowing capacity.

9. The system of claim 5 further including a wastegate valve having an inlet fluidly coupled to said second conduit and an outlet;

and wherein said actuator is responsive to said actuator command to control a position of said wastegate valve relative to a reference position to thereby selectively divert engine exhaust away from said turbine;

and wherein said predefined command corresponds to a predefined wastegate valve position.

10. The system of claim 5 further including an exhaust throttle having an inlet receiving exhaust gas produced by the engine and an outlet;

and wherein said actuator is responsive to said actuator command to control a position of said exhaust throttle relative to a reference position to thereby selectively control exhaust gas flow through said turbine and correspondingly control a swallowing capacity of said turbine;

and wherein said predefined command corresponds to a predefined exhaust throttle position.

11. System for accommodating sensor failure in the operation of an internal combustion engine, the system comprising:

a sensor producing a first engine operating condition signal indicative of a first engine operating condition;

means for estimating said first engine operating condition as a function of a number of engine operating parameters different than said first engine operating condition and producing a corresponding first engine operating condition estimate;

means for determining whether a sensor producing any of said number of engine operating parameters different than said first engine operating condition has failed;

means for producing a first commanded engine operating condition value corresponding to a desired value of said first engine operating condition;

means for producing a first engine operating condition value indicative of said first engine operating condition, said first engine operating condition value corresponding to said first engine operating condition estimate if only said sensor producing said first engine operating command signal has failed, said first engine operating condition value corresponding to said first commanded engine operating condition value if said sensor producing said first engine operating command signal has failed and said sensor producing any of said number of engine operating parameters has also failed, said first engine operating condition value corresponding to said first engine operating condition signal if neither of said sensor producing said first engine operating command signal and said sensor producing any of said number of engine operating parameters has failed;

means for producing a first error value as a difference between said first commanded engine operating condition and said first engine operating condition value;

a first actuator responsive to a actuator command to control a first air handling mechanism associated with the engine; and means for producing said first actuator command as a function of said first error value if said first engine operating condition value corresponds to either of said first engine operating condition signal and said first engine operating condition estimate, and otherwise producing a first predefined command as said first actuator command.

12. The system of claim 11 further including:

means for estimating a second engine operating condition value as a function of at least said first engine operating condition value;

means for producing a second error value as a difference between a second commanded engine operating condition and said second engine operating condition value;

a second actuator responsive to a second actuator command for controlling a second air handling mechanism associated with the engine; and means for producing said second actuator command as a function of said second error value if said first engine operating condition value corresponds to either of said engine operating condition signal and said engine operating condition estimate, and otherwise producing a second predefined command as said second actuator command.

13. The system of claim 12 further including a turbocharger having a compressor fluidly coupled to an intake manifold of the engine via a first conduit and a turbine fluidly coupled to an exhaust manifold of the engine via a second conduit;

and wherein said first engine operating condition is pressure within said first conduit, and said sensor producing said first engine operating condition signal is a first pressure sensor producing a first pressure signal indicative of said pressure within said first conduit;

and wherein said second engine operating condition is a mass flow rate of air charge supplied to said intake manifold.

14. The system of claim 13 further including:

a temperature sensor producing a temperature signal indicative of intake manifold temperature;

a speed sensor producing a speed signal indicative of rotational speed of the engine;

a flow restriction mechanism having an inlet in fluid communication with said exhaust manifold and an outlet in fluid communication with said intake manifold; and a second pressure sensor producing a second pressure signal indicative of a pressure differential across said flow restriction mechanism;

and wherein said means for estimating said second engine operating condition is operable to estimate said mass flow rate of air charge supplied to said intake manifold as a function of said temperature signal, said speed signal, said second pressure signal and said first engine operating condition value.

15. The system of claim 11 further including a turbocharger having a compressor fluidly coupled to an intake manifold of the engine via a first conduit and a turbine fluidly coupled to an exhaust manifold of the engine via a second conduit;

and wherein said first engine operating condition is rotational speed of said turbocharger, and said sensor producing said first engine operating condition signal is a first speed sensor producing a first speed signal indicative of said rotational speed of said turbocharger.

16. The system of claim 15 further including:

a temperature sensor producing a temperature signal indicative of air temperature entering an inlet of said compressor;

a first pressure sensor producing a first pressure signal indicative of air pressure within said first conduit;

a second pressure sensor producing a second pressure signal indicative of air pressure entering said inlet of said compressor;

a second speed sensor producing a second speed signal indicative of rotational speed of the engine; and and wherein said means for estimating said first engine operating condition is operable to estimate said rotational speed of said turbocharger as a function of said temperature signal, said first pressure signal, said second pressure signal and said second speed signal.

17. The system of claim 15 wherein said turbine is a variable geometry turbine;

and wherein said first actuator is responsive to said first actuator command to control the geometry of said turbine to thereby selectively control a swallowing capacity of said turbine;
and wherein said first predefined command corresponds to a predefined turbine swallowing capacity.

18. The system of claim 15 further including a wastegate valve having an inlet fluidly coupled to said second conduit and an outlet;
and wherein said first actuator is responsive to said first actuator command to control a position of said wastegate valve relative to a reference position to thereby selectively divert engine exhaust away from said turbine;
and wherein said first predefined command corresponds to a predefined wastegate valve position.

19. The system of claim 15 further including an exhaust throttle having an inlet receiving exhaust gas produced by the engine and an outlet;
and wherein said first actuator is responsive to said first actuator command to control a position of said exhaust throttle relative to a reference position to thereby selectively control exhaust gas flow through said turbine and correspondingly control a swallowing capacity of said turbine;
and wherein said first predefined command corresponds to a predefined exhaust throttle position.

20. The system of claim 11 further including a turbocharger having a compressor fluidly coupled to an intake manifold of the engine via a first conduit and a turbine fluidly coupled to an exhaust manifold of the engine via a second conduit;
and wherein said first engine operating condition is pressure within said first conduit, and said sensor producing said first engine operating condition signal is a first pressure sensor producing a first pressure signal indicative of said pressure within said first conduit.

21. The system of claim 20 further including:
a temperature sensor producing a temperature signal indicative of air temperature entering an inlet of said compressor;
a second pressure sensor producing a second pressure signal indicative of air pressure entering said inlet of said compressor;
a first speed sensor producing a first speed signal indicative of rotational speed of said turbocharger; and
a second speed sensor producing a second speed signal indicative of rotational speed of the engine;
and wherein said means for estimating said first engine operating condition is operable to estimate said pressure within said first conduit as a function of said temperature signal, said second pressure signal, said first speed signal and said second speed signal.

22. The system of claim 20 further including an EGR valve having an inlet fluidly coupled to said exhaust manifold and an outlet fluidly coupled to said intake manifold;
and wherein said first actuator is responsive to said first actuator command to control a position of said EGR valve relative to a reference position to thereby selectively direct exhaust gas from said exhaust manifold to said intake manifold;
and wherein said first predefined command corresponds to an EGR valve closed command.

23. The system of claim 20 wherein said turbine is a variable geometry turbine;

and wherein said first actuator is responsive to said first actuator command to control the geometry of said turbine to thereby selectively control a swallowing capacity of said turbine;
and wherein said first predefined command corresponds to a predefined turbine swallowing capacity.

24. The system of claim 20 further including a wastegate valve having an inlet fluidly coupled to said second conduit and an outlet;
and wherein said first actuator is responsive to said first actuator command to control a position of said wastegate valve relative to a reference position to thereby selectively divert engine exhaust away from said turbine;
and wherein said first predefined command corresponds to a predefined wastegate valve position.

25. The system of claim 20 further including an exhaust throttle having an inlet receiving exhaust gas produced by the engine and an outlet;
and wherein said first actuator is responsive to said first actuator command to control a position of said exhaust throttle relative to a reference position to thereby selectively control exhaust gas flow through said turbine and correspondingly control a swallowing capacity of said turbine;
and wherein said first predefined command corresponds to a predefined exhaust throttle position.

26. A method of accommodating sensor failure in the operation of an internal combustion engine, the method comprising the steps of:
sensing an engine operating condition signal indicative of an engine operating condition;
estimating said engine operating condition as a function of a number of engine operating parameters different than said engine operating condition and producing a corresponding engine operating condition estimate;
determining a commanded engine operating condition value corresponding to a desired value of said engine operating condition; and
determining whether a sensor producing any of said number of engine operating parameters different than said engine operating condition has failed; and
producing an engine operating condition value indicative of said engine operating condition, said engine operating condition value corresponding to said engine operating condition estimate if said engine operating condition signal indicates a failure associated only with a sensor producing said engine operating condition signal, said engine operating condition value corresponding to said commanded engine operating condition value if said sensor producing said engine operating condition signal and said sensor producing any of said number of engine operating parameters has failed, said engine operating condition value corresponding to said engine operating condition signal if neither of said sensor producing said engine operating condition signal and said sensor producing any of said number of engine operating parameters has failed.

27. The method of claim 26 further including the steps of:
determining an error value as a difference between said commanded engine operating condition and said engine operating condition value;
producing an actuator command for controlling an air handling mechanism associated with the engine; and
determining said actuator command as a function of said error value if said engine operating condition value corresponds to either of said engine operating condition signal and said first engine operating condition estimate, and otherwise producing a predefined command as said actuator command.

28. The method of claim 27 wherein said engine operating condition is rotational speed of a turbocharger having a compressor fluidly coupled via a first conduit to an intake manifold of the engine and a turbine fluidly coupled via a second conduit to an exhaust manifold of the engine.

29. The method of claim 28 further including the steps of:
determining temperature of air entering an inlet of said compressor;
determining pressure of air entering said inlet of said compressor;
determining pressure of air within said first conduit; and
determining rotational speed of the engine;
and wherein the estimating step includes estimating said rotational speed of said turbocharger as a function of said temperature of air entering said inlet of said compressor, said pressure of air entering said inlet of said compressor, said pressure of air within said first conduit and said rotational speed of the engine.

30. The method of claim 28 wherein the step of determining said actuator command includes determining said actuator command to control a geometry of said turbine to thereby selectively control a swallowing capacity of said turbine;
and wherein said predefined command corresponds to a predefined turbine swallowing capacity.

31. The method of claim 28 wherein the step of determining said actuator command includes determining said actuator command to control a position of a wastegate valve relative to a reference position to thereby selectively divert engine exhaust away from said turbine;
and wherein said predefined command corresponds to a predefined wastegate valve position.

32. The method of claim 28 wherein the step of determining said actuator command includes determining said actuator command to control a position of an exhaust throttle relative to a reference position to thereby selectively control exhaust gas flow through said turbine and correspondingly control a swallowing capacity of said turbine;
and wherein said predefined command corresponds to a predefined exhaust throttle position.

33. The method of claim 27 wherein said engine operating condition is pressure within a first conduit fluidly coupling a compressor of a turbocharger to an intake manifold of the engine.

34. The method of claim 33 further including the steps of:
determining temperature of air entering an inlet of said compressor;
determining pressure of air entering said inlet of said compressor;
determining rotational speed of said turbocharger; and
determining rotational speed of the engine;
and wherein the estimating step includes estimating said pressure within said first conduit as a function of said temperature of air entering said inlet of said compressor, said pressure of air entering said inlet of said compressor, said rotational speed of said turbocharger and said rotational speed of the engine.

35. The method of claim 33 wherein the step of determining said actuator command includes determining said actuator command to control a position of an EGR valve relative to a reference position to thereby selectively direct exhaust gas from an exhaust manifold of the engine to said intake manifold;
and wherein said predefined command corresponds to an EGR valve closed command.

36. The method of claim 33 wherein the step of determining said actuator command includes determining said actuator command to control a geometry of said turbine to thereby selectively control a swallowing capacity of said turbine;
and wherein said predefined command corresponds to a predefined turbine swallowing capacity.

37. The method of claim 33 wherein the step of determining said actuator command includes determining said actuator command to control a position of a wastegate valve relative to a reference position to thereby selectively divert engine exhaust away from said turbine;
and wherein said predefined command corresponds to a predefined wastegate valve position.

38. The method of claim 33 wherein the step of determining said actuator command includes determining said actuator command to control a position of an exhaust throttle relative to a reference position to thereby selectively control exhaust gas flow through said turbine and correspondingly control a swallowing capacity of said turbine;
and wherein said predefined command corresponds to a predefined exhaust throttle position.

* * * * *

UNITED STATES PATENT AND TRADEMARK OFFICE
CERTIFICATE OF CORRECTION

PATENT NO. : 6,804,601 B2  
DATED : October 12, 2004  
INVENTOR(S) : Wang et al.

Page 1 of 1

It is certified that error appears in the above-identified patent and that said Letters Patent is hereby corrected as shown below:

Column 5,
Line 30, "...gelectrically..." should read -- ...electrically... --

Column 8,
Line 44, "block 34" should read -- block 134... --

Column 9,
Lines 19 and 44, "block 34" should read -- block 134... --

Column 16,
Lines 15 and 21, "value, TSf is" should read -- value, TSF is... --

Column 19,
Line 46, "responsive to a actuator..." should read -- responsive to a first actuator... --

Signed and Sealed this

Tenth Day of May, 2005

JON W. DUDAS  
*Director of the United States Patent and Trademark Office*